United States Patent Office 3,130,188
Patented Apr. 21, 1964

3,130,188
CATALYST AND PROCESS FOR PRODUCING OLEFIN POLYMERS
John P. Hogan, Bartlesville, Okla., assignor to Phillips Petroleum Company, a corporation of Delaware
No Drawing. Filed Oct. 7, 1960, Ser. No. 61,070
14 Claims. (Cl. 260—94.9)

This invention relates to the catalytic polymerization of olefinic hydrocarbons to higher molecular weight products. In accordance with one aspect, this invention relates to an improved process for producing polymers of 1-olefins. In accordance with another aspect, this invention relates to a novel and improved catalyst to promote the polymerization of 1-olefins.

The production of normally solid polymers of 1-olefins by polymerization of such olefins in the presence of a catalyst comprising chromium oxide associated with at least one member of the group consisting of silica, alumina, zirconia, and thoria wherein at least part of the chromium is hexavalent is described in U.S. Patent 2,825,721 (1958) of Hogan et al. This process produces thermoplastic polymers which can be molded to form objects of any desired shape or configuration, extruded and cold-drawn to form filaments, or fabricated to form film. The present invention relates to a catalyst of the type described in the above-cited Hogan et al. patent having improved activity for the polymerization of 1-olefins.

Accordingly, an object of this invention is to provide an improved catalyst to promote the polymerization of 1-olefins.

Another object of this invention is to provide improved methods for forming olefin polymerization catalysts.

Another object of this invention is to increase the polymerization activity and polymer productivity of a polymerization catalyst.

A further object of this invention is to obtain a narrower molecular weight distribution of the polymer product with an improved polymerization catalyst.

Still another object of this invention is to provide an improved process for the production of solid 1-olefin polymers, especially polymers of ethylene.

Other objects, aspects as well as the several advantages of this invention will be apparent to those skilled in the art on a further study of the specification and the appended claims.

In accordance with the present invention, an improved supported chromium oxide polymerization catalyst is provided by heating at least the support component of said catalyst together with ammonium silicofluoride or fluosilicate [$(NH_4)_2SiF_6$] at an elevated temperature to increase the polymerizing activity. The addition of ammonium silicofluoride, in accordance with the invention, results in a catalyst of increased polymerization activity as well as the production of polymeric products of narrower molecular weight distribution. The support employed can comprise one or more members of the group consisting of silica, alumina, zirconia, and thoria and includes silica-alumina, silica-alumina-zirconia, silica-zirconia, acid treated clays and similar complexes or composites known in the art as catalyst components. This class of materials is referred to herein as a "support" for purposes of convenience. This term does not necessarily require that these materials be catalytically inert.

Also, in accordance with the present invention, 1-olefins, especially ethylene, can be polymerized to obtain increased yields of polymer, as well as polymeric products having a narrower molecular weight distribution by the use of a catalyst prepared in accordance with this invention as described hereinbefore. The polymerization includes ethylene homopolymerization and copolymerization of ethylene with at least one olefin having a higher molecular weight, especially aliphatic olefins having from 3 to 12 carbon atoms per molecule, for example, propylene, 1-butene, 2-butene, isobutylene, 1-pentene, 1-hexene, 4-methyl-1-pentene, 1-octene, 1-dodecene and the like. Frequently, the higher olefin is utilized in minor amounts as compared with ethylene and usually does not exceed about 25 weight percent of the total comonomeric feed mixture.

As set forth more fully in the above cited Hogan et al. patent, a valuable polymerization catalyst can be prepared by depositing chromium oxide (e.g., $CrO_3$), or a chromium compound calcinable to chromium oxide (e.g., chromic nitrate, chromic sulfate, ammonium chromate, or chromium carbonate) on a support, for example, silica-alumina, and activating by heating at an elevated temperature to leave at least part of the chromium, preferably at least 0.1 weight percent based on total catalyst weight, in hexavalent form. This type of activation procedure is frequently conducted by heating the dried chromium oxide-silica-alumina composite at a temperature of approximately 450 to 1500° F. for several hours in such an atmosphere that the chromium oxide is at least partially in the hexavalent state at the termination of the heating. It is ordinarily preferred that the heating be conducted in the presence of an oxygen-containing gas such as air. However, the atmosphere can be nitrogen or other inert gas. Alternatively, the heating can be effected in a vacuum. Reducing gases can be present provided that they are present in such amount that not all of the hexavalent chromium is reduced and some remains in the final catalyst. It is preferred that reducing gases be absent. The total chromium content of the catalyst is generally in the range 0.5 to 30 weight percent, preferably in the range 1 to 6 weight percent, but can be outside the broad range, if desired.

In accordance with the present invention, an improved catalyst is obtained when, in conjunction with the aforedescribed process steps, the silica-alumina, or other support component, is mixed with ammonium silicofluoride [$(NH_4)_2SiF_6$] and heated at an elevated temperature. The ammonium silicofluoride can be added before, after, or simultaneously with the addition of the chromium compound and can be added as an aqueous solution or by "dry mixing."

In accordance with one preparation procedure of this invention, the catalyst can be prepared by heating the support, for example, silica-alumina, in the absence of chromium oxide and in the presence of ammonium silicofluoride, at an elevated temperature, depositing chromium oxide on the resulting composite and heating to achieve final activation.

Alternatively, the catalyst can be prepared by depositing chromium oxide or a chromium compound calcinable thereto on the support, for example, silica-alumina, drying (when water is present), and heating the resulting chromium oxide-containing composite at an elevated temperature in the presence of ammonium silicofluoride.

As another catalyst preparation procedure in accordance with this invention, one can coimpregnate silica-alumina (or other support) with a solution of ammonium silicofluoride and chromium oxide (or a chromium compound calcinable to chromium oxide) and heating the resulting composite at an elevated temperature to impart the desired amount of polymerization activity thereto.

The heating, in accordance with this invention, of the support or chromium oxide-containing composite in the presence of ammonium silicofluoride should occur at a temperature preferably not exceeding 1500° F. unless the time of exposure to such temperature is extremely short, for example one minute or less. Preferably, the temperature should be within the range 750 to 1400° F. but can range from 450 to 1400° F. Heating is ordinarily conducted for a period of time in the range 5 minutes to 20 hours or longer and preferably in the range 30 minutes to 10 hours.

The amount of ammonium silicofluoride incorporated or added to the catalyst in accordance with this invention is generally within the range 0.1 to 8 weight percent based on total catalyst weight. These figures represent the ammonium silicofluoride on an anhydrous basis, i.e., amount of ammonium silicofluoride added is sufficient to give the catalyst, prior to heating, an $(NH_4)_2SiF_6$ content in the range 0.1 to 8 weight percent. Preferably, the amount of added ammonium silicofluoride is in the range 0.5 to 7 weight percent. Amounts of ammonium silicofluoride outside the stated ranges can be added. However, amounts below 0.1 weight percent produce less effect than could otherwise be realized, and amounts greater than 8 weight percent do not produce sufficient additional activation to justify the added consumption of ammonium silicofluoride.

The polymerization or copolymerization in accordance with this invention can be conducted in accordance with the techniques which are well known to those skilled in this art. The olefin monomeric feed can consist of ethylene as the sole monomer when an ethylene homopolymer is desired. When a copolymer of ethylene is desired, the monomeric feed generally contains a major proportion of ethylene and a minor proportion of an olefin having a higher molecular weight, such as, for example, propylene, 1-butene, 1-pentene, 1-hexene, 4-methyl-1-pentene, 1,3-butadiene, isoprene, and the like. In many cases, the higher olefin is present in amounts less than about 25 weight percent based on total olefin feed.

The reaction can be conducted in the gaseous phase, the liquid phase, or a mixed gas-liquid phase. Frequently, it is desirable to have present a diluent, since the thermal effects of the polymerization reaction are readily controllable in the presence of a liquid diluent. The diluent can be any hydrocarbon which is chemically inert and nondeleterious to the catalyst under the reaction conditions. Generally, the diluent is selected from the group consisting of paraffins and cycloparaffins having from 3 to 12 carbon atoms per molecule.

Suitable diluents include propane, isobutane, normal butane, isopentane, normal pentane, the isohexanes, normal hexane, the isooctanes, the dodecanes, cyclopentane, methylcyclopentane, cyclohexane, methylcyclohexane, and the dimethylcyclohexanes. Aromatic hydrocarbons having from 6 to 12 carbon atoms per molecule can be used. However, these hydrocarbons, or impurities which normally accompany them, appear to deactivate the catalyst somewhat and consequently are frequently not preferred. However, it is entirely within the scope of the invention to utilize such aromatic hydrocarbons as benzene, toluene, the xylenes or ethylbenzene. The diluent, when used, is generally present in sufficient amounts so that the olefin concentration of the total hydrocarbon feed is of the order of 0.5 to 10 weight percent, though these limits are not absolute.

The temperature to be employed in carrying out the polymerization reactions of this invention can vary over a broad range, but normally ranges from about 100 to about 500° F. However, more frequently, the temperature is in the range 150 to 350° F.

The pressure is preferably high enough to maintain the diluent, when a liquid diluent is used, in the liquid phase and to assure that olefins not liquefied under these conditions are dissolved in the liquid phase in sufficient amount. Pressures of the order of about 50 to about 700 lbs. per square inch are generally adequate for this purpose. In general, the reaction pressure can vary from approximately atmospheric to as high as several thousand pounds per square inch. The residence or reaction time can range from a few minutes to several hours and is generally in the range 15 minutes to 3 hours.

The catalyst contacting technique can be any of those well known in the catalyst arts. Thus, the reaction can be conducted by contacting the hydrocarbon feed with a fixed bed of catalyst, with a gravitating bed of catalyst, with a catalyst suspended in finely divided particulate form in the diluent and being maintained in suspension by agitation, or by the use of the fluidized-bed technique.

When the reaction is conducted at temperatures of approximately 225° F. and below, so that the polymer or copolymer which forms in the form of a solid granular suspension in the reaction mixture, the polymer can be recovered by withdrawing reaction mixture from the reactor, removing supernatant liquid by decantation, filtration and/or vaporization and recovering the polymer thus freed from diluent. When the reaction is conducted at temperatures above about 225° F., the polymer is at least partially in solution in the diluent. Under these conditions, the reaction mixture can be withdrawn from the reactor, unreacted olefin removed, for example, by flashing, the catalyst removed by filtration or centrifugation, and the polymer recovered from solution in the diluent by cooling to precipitate the polymer and subsequently filtering or by vaporizing the diluent. Other reaction techniques and recovery methods known to those skilled in this art are applicable in the practice of the present invention.

The following specific examples present preferred embodiments of this invention. It should be evident that these examples are presented as an illustration of the invention rather than a limitation thereof.

EXAMPLE I

A series of polymerization runs was carried out in which chromium oxide catalysts treated with various amounts of ammonium silicofluoride $[(NH_4)_2SiF_6]$ were employed for the copolymerization of ethylene and 1-butene.

In these runs, a 90/10 silica/alumina catalyst support was impregnated with an aqueous solution of chromium oxide and $(NH_4)_2SiF_6$ so that the final catalyst contained 2.5 weight percent Cr. The amount of ammonium silicofluoride used in the impregnation is shown below in the table. The composites were then activated at 1000° F. with substantially anhydrous air (dew point below −60° F.) for approximately 5 hours, after which the catalysts were employed for copolymerization of ethylene with 1-butene.

The polymerization runs were carried out at 450 p.s.i.g. and at 250–260° F. for one hour, using cyclohexane as the polymerization solvent. The olefin feed to the polymerization reactor contained 3–5 weight percent 1-butene, the remainder of which was ethylene. At the end of each polymerization run, the polymer was recovered by evaporating off the solvent, and various properties of the polymer were determined. The results of these runs are expressed below as Table I.

Table I

| Run No. | Wt. Percent (NH$_4$)$_2$SiF$_6$ Employed | Polymer Properties ||||| CIL/MI | MW/MN[6] |
|---|---|---|---|---|---|---|---|---|
| | | Density[1] | Melt Index[2] | Vis.[3] | CIL[4] | Vinyls/1,000 C[5] | | |
| 1 | 0 | 0.9491 | 0.26 | 2.21 | 1.72 | 1.18 | 6.6 | 14.1 |
| 2 | 0.5 | 0.9487 | 0.38 | 2.16 | 1.65 | 1.18 | 4.3 | 13.9 |
| 3 | 1.5 | 0.9485 | 0.36 | 2.12 | 1.26 | 1.03 | 3.5 | 11.8 |
| 4 | 3.5 | 0.9486 | 0.28 | 2.16 | 1.06 | 0.84 | 3.8 | 9.9 |

[1] In density determinations the specimens were prepared by compression molding the polymer at 340° F. until completely molten followed by cooling to 200° F. at a rate of about 10° F. per minute. Water is then circulated through the mold jacket to continue the cooling to 150° F. at a rate not exceeding 20° F. per minute. The polymer is then removed from the mold and cooled to room temperature. Density is determined by placing a smooth, void-free, pea-sized specimen cut from a compression molded slab of the polymer in a 50-ml., glass-stoppered graduate. Carbon tetrachloride and methylcyclohexane are added to the graduate from burettes in proportion such that the specimen is shaken to secure thorough mixing. When the mixture just suspends the specimen, a portion of the liquid is transferred to a small test tube and placed on the platform of Westphal balance and the glass bob lowered therein. With the temperature shown by the thermometer in the bob in the range 73–78° F., the balance is adjusted until the pointer is at zero. The value shown in the scale is taken as the specific gravity. With the balance standardized to read 1.000 with a sample of distilled water at 39.2° F. the specific gravity will be numerically equal to density in grams per cc.

[2] Melt index as determined by ASTM D-1238-57T except 5 cuts are made and average of these is determined.

[3] Inherent viscosity [n] at 266° F. in tetralin using 0.1 gram polymer per 100-ml. tetralin.

[4] High shear flow determined on Canadian Industries Limited viscometer at 500° F. and 1000 p.s.i.

[5] Determined by infrared.

[6] Weight average molecular weight (Mw) was calculated from the relationship MW = (2,640 [n])$^{1.359}$, and number average molecular weight (MN) = 14,000/vinyls per 1000 carbons.

The decrease in the ratio of CIL to melt index as the amount of ammonium silicofluoride promoter increases and the decrease in ratio of weight average molecular weight to number average molecular weight with increased promoter shows that increasing amounts of the promoter causes a narrowing of the molecular weight distribution of the polymer.

EXAMPLE II

A further series of runs was carried out in which the promoted catalysts of this invention were employed in a slurry type homopolymerization of ethylene. These runs were carried out using a reaction diluent and a reaction temperature such that the polymers precipitated out as formed.

In these runs, each run was carried out for 1.5 hours at 210° F. and 450 p.s.i.g., using n-pentane as the diluent. The catalyst in each run contained 2.5 weight percent Cr supported on the silica-alumina of Example I. In runs 6–9, the catalyst support was impregnated with a CrO$_3$ solution, after which the catalyst was dried. The dry catalyst was then mixed with the desired amount of finely divided (NH$_4$)$_2$SiF$_6$, after which the composite was activated at 1000° F. as described in Example I. In Table 2 below, this method of addition is referred to as "mixed." In run 10, the desired amount of (NH$_4$)$_2$SiF$_6$ was coimpregnated with the CrO$_3$ solution, after which the composite was activated at 1000° F. A control run (run 5) is presented in Table 2 for comparison.

Table II

| Run No. | Wt. Percent (NH$_4$)$_2$SiF$_6$ Added to Catalyst | Method of Addition | Productivity, #Polymer/#Catalyst | Polymer HLMI[1] |
|---|---|---|---|---|
| 5 | 0 | | 1,570 | 0.45. |
| 6 | 1.25 | Mixed | 3,000 | not meas. |
| 7 | 2.5 | do | 3,200 | 0.31. |
| 8 | 3.5 | do | 3,860 | not meas. |
| 9 | 5.0 | do | 3,900 | 0.21. |
| 10 | 3.5 | Coimpregnated | 4,580 | 0.29. |

[1] ASTM D-1238-57T (Procedure F) using a weight of 21,600 grams.

EXAMPLE III

In another series of runs, a chromium oxide-containing catalyst which had been promoted with (NH$_4$)$_2$SiF$_6$ was employed for the solution homopolymerization of ethylene and solution copolymerization of ethylene with various 1-olefins using cyclohexane as the polymerization solvent. In these runs, the silica-alumina support of Example I was impregnated with a CrO$_3$ solution and 3.5 weight percent (NH$_4$)$_2$SiF$_6$, after which the coimpregnated composite was activated at 1000° F. as described in Example I. The Cr content in the catalyst was 2.5 weight percent. The solution polymerization runs were carried out at 250 p.s.i.g. and approximately 250–260° F. for 1.5 hours. The results of these runs are expressed below as Table III.

Table III

| Run No. | Comonomer || Reactor Temp., ° F. | Productivity, #Polymer per #Catalyst | Polymer ||
|---|---|---|---|---|---|---|
| | Compound | Wt. percent in Feed | Mol percent in Feed | | | Density[1] | MI[1] |
| 11 | None | | | 260 | 2,000 | | |
| 12 | Propylene | 24.4 | 17.7 | 251 | 1,190 | 0.925 | 0.95 |
| 13 | 1-Butene | 19.8 | 11.0 | 248 | 1,340 | 0.933 | 1.02 |
| 14 | 1-Pentene | 20.0 | 9.1 | 255 | 1,780 | 0.933 | 1.03 |
| 15 | 1-Octene | 23.7 | 7.2 | 253 | 2,077 | 0.931 | 1.15 |

[1] See footnotes 1 and 2 to Table I.

The above data show that the promoted catalyst of this invention has high activity for solution homopolymerization of ethylene and solution copolymerization of ethylene with various 1-olefins.

EXAMPLE IV

A further series of runs was carried out in which chromium oxide catalysts were promoted with (NH$_4$)$_2$SiF$_6$ In these runs, the catalyst support was silica rather than the silica-alumina of the preceding examples. These catalysts were employed for the solution polymerization of ethylene and the solution copolymerization of ethylene with 1-butene.

Each run was carried out for one hour at 450 p.s.i.g. and a reactor temperature ranging from 250–295° F. The catalysts employed were prepared by coimpregnating the silica support with a chromium trioxide solution and the desired amount of ammonium silicofluoride solution. The catalyst, after activation at 1000° F. as described in the preceding examples, contained 2.5 weight percent Cr. The amount of ammonium silicofluoride added to the catalyst in each run is shown in Table IV.

Table IV

ETHYLENE HOMOPOLYMER

| Run No. | Catalyst Support | Catalyst Wt. percent (NH$_4$)$_2$SiF$_6$ | Av. Reactor Temp., °F. | Wt. percent 1-Butene | Productivity, #Polymer/#Catalyst | Melt Index[1] | Density[1] |
|---|---|---|---|---|---|---|---|
| 16 | Silica | 0 | 286 | 0 | 690 | 0.17 | 0.960 |
| 17 | do | 0 | 292 | 0 | 820 | 0.21 | 0.960 |
| 18 | do | 0 | 293 | 0 | 870 | 0.28 | 0.960 |
| 19 | do | 0 | 295 | 0 | 590 | 0.29 | 0.960 |
| 20 | do | 0 | 298 | 0 | 570 | 0.36 | 0.960 |
| 21 | do | 0.5 | 294 | 0 | 1,500 | 0.31 | 0.960 |
| 22 | do | 1.5 | 285 | 0 | 920 | 0.24 | 0.960 |
| 23 | do | 3.5 | 284 | 0 | 1,190 | 0.45 | 0.960 |

ETHYLENE 1-BUTENE COPOLYMER

| Run No. | Catalyst Support | Catalyst Wt. percent (NH$_4$)$_2$SiF$_6$ | Av. Reactor Temp., °F. | Wt. percent 1-Butene | Productivity, #Polymer/#Catalyst | Melt Index[1] | Density[1] |
|---|---|---|---|---|---|---|---|
| 24 | Silica | 0 | 256 | 5.4 | 1,140 | 0.10 | 0.950 |
| 25 | do | 0 | 263 | 4.7 | 1,190 | 0.15 | 0.950 |
| 26 | do | 0 | 267 | 4.6 | 980 | 0.20 | 0.950 |
| 27 | do | 0 | 274 | 5.9 | 1,030 | 0.29 | 0.951 |
| 28 | do | 0 | 275 | 5.6 | 1,960 | 0.28 | 0.948 |
| 29 | do | 0.5 | 256 | 6.2 | 1,090 | 0.10 | 0.950 |
| 30 | do | 0.5 | 267 | 6.9 | 1,120 | 0.20 | 0.949 |
| 31 | do | 1.5 | 254 | 6.4 | 1,070 | 0.13 | 0.950 |
| 32 | do | 1.5 | 263 | 5.4 | 1,450 | 0.28 | 0.949 |
| 33 | do | 3.5 | 256 | 5.6 | 1,280 | 0.34 | 0.947 |
| 34 | do | 3.5 | 263 | 4.8 | 1,340 | 0.66 | 0.944 |

[1] See footnotes 1 and 2, Example I.

The above runs show that the productivity, a method of showing catalyst activity, is increased by the promoters of this invention. It can also be seen that the promoter of this invention has an effect on the density of the polymer produced. That is, a greater amount of 1-butene is incorporated, so that the density is lowered by the use of ammonium silicofluoride.

In operation, to obtain a given density the amount of 1-butene in the feed can be lowered when ammonium silicofluoride is used, as shown in Example V.

EXAMPLE V

A further series of runs was carried out in which chromium oxide-silica-alumina catalyst were treated with various amounts of ammonium silicafluoride. These catalysts were used for the solution copolymerization of ethylene and 1-butene.

Each run was carried out for one hour at 450 p.s.i.g. and temperatures ranging from 253 to 258° F. The catalysts employed were prepared by coimpregnating the silica-alumina support with a solution of chromium trioxide and the desired amount of ammonium silicofluoride. The catalysts were activated in air at 1000° F. for 5 hours and contained 2.5 weight percent chromium. One catalyst containing no ammonium silicofluoride, but otherwise identical to the other catalysts, is included.

Table V

| Run No. | Wt. Percent (NH$_4$)$_2$SiF$_6$ Used in Catalyst Prep. | Av. Reaction Temp., °F. | Wt. Percent 1-Butene in Olefin Feed | Prod., #/# | Melt Index[1] | Density[1] |
|---|---|---|---|---|---|---|
| 35 | 0 | 258 | 5.3 | 1,261 | 0.26 | 0.9491 |
| 36 | 0.5 | 255 | 5.6 | 1,520 | 0.38 | 0.9487 |
| 37 | 1.5 | 255 | 5.3 | 1,751 | 0.36 | 0.9485 |
| 38 | 3.5 | 253 | 3.8 | 1,961 | 0.28 | 0.9486 |
| 39 | 3.5 | 255 | 3.5 | 2,510 | 0.55 | 0.9472 |

[1] See footnotes 1 and 2, Example I.

These runs show that less 1-butene is required in the olefin feed when the catalyst contains the promoter of this invention.

As will be evident to those skilled in the art, many variations and modifications of this invention can be practiced in view of the foregoing disclosure. Such variations and modifications are clearly believed to come within the spirit and scope of the invention.

I claim:

1. A polymerization process which comprises polymerizing monomers selected from the group consisting of ethylene and mixtures of ethylene with up to 25 weight percent, based on total monomer, of at least one higher molecular weight 1-olefin having from 3–12 carbon atoms per molecule under polymerization conditions of temperature and pressure in the presence of a catalyst consisting of chromium oxide supported on at least one member of the group consisting of silica, alumina, zirconia and thoria, wherein at least part of the chromium is hexavalent, said catalyst having been improved in activity by incorporating ammonium silicofluoride therein and then heating at a temperature in the range 450 to 1400° F. for a period of time sufficient to increase the activity of said catalyst in polymerizing said monomers and leave at least part of the chromium in the hexavalent state.

2. A polymerization process which comprises polymerizing ethylene to a normally solid homopolymer at a temperature in the range from 100 to 500° F. by contacting ethylene with a catalyst consisting of chromium oxide supported on at least one member of the group consisting of silica, alumina, zirconia and thoria, and wherein at least part of the chromium is hexavalent, said catalyst having been improved in activity by heating same at a temperature in the range 750–1400° F. in the presence of ammonium silicofluoride prior to use in said polymerization.

3. A process for the preparation of a homopolymer of ethylene which comprises contacting ethylene at a temperature in the range 150 to 350° F. with an activated catalyst consisting of a chromium oxide and at least one compound selected from the group consisting of silica, alumina, zirconia and thoria and wherein at least part of the chromium is hexavalent, and recovering polymer thus produced, said catalyst before polymerization having been improved in activity by incorporating therein from 0.1 to 8 weight percent, based on total catalyst weight, of ammonium silicofluoride and heating at a temperature from 450° F. to 1400° F. for a period of time sufficient to increase the activity of said catalyst for polymerizing ethylene.

4. A polymerization process which comprises polymerizing ethylene to a solid homopolymer at a temperature in the range 150 to 350° F. in the presence of a catalyst prepared by depositing ammonium silicofluoride and at least one compound selected from the group consisting of chromium oxide and chromium compounds calcinable to chromium oxide on at least one member of the group consisting of silica, alumina, zirconia and thoria, the amount of said ammonium silicofluoride deposited ranging from 0.1 to 8 weight percent based on total catalyst weight, heating the resulting mixture in the range 750 to 1400° F. for a period of time in the range of 5 minutes to 20 hours, thus leaving at least part of the chromium in hexavalent state, and recovering a solid polymer of ethylene.

5. In a catalytic process for polymerizing monomers selected from the group consisting of ethylene and mixtures of ethylene with higher molecular weight 1-olefins having from 3–12 carbon atoms per molecule to normally solid polymers using as the polymerization catalyst a chromium oxide and at least one compound selected from the group consisting of silica, alumina, zirconia and thoria and wherein at least part of the chromium is in the hexavalent state, the improvement comprising pretreating said catalyst by heating at a temperature not exceeding 1500° F. in the presence of ammonium silicofluoride for a period of time sufficient to increase the activity of said catalyst in polymerizing said monomers and leave at least part of the chromium in the haxevalent state.

6. In a process for preparing a catalyst by depositing chromium oxide on at least one member of the group consisting of silica, alumina, zirconia and thoria as a support, at least part of the chromium in the finished catalyst being hexavalent, and activating by heating at an elevated temperature not exceeding 1500° F., the improvement which comprises activating said catalyst by heating in the presence of ammonium silicofluoride for a period of time sufficient to increase the polymerization activity of said catalyst and leave at least part of the chromium in the hexavalent state.

7. A catalyst preparation process which comprises depositing on at least one member of the group consisting of silica, alumina, zirconia and thoria as a support, a compound selected from the group consisting of chromium oxide and compounds of chromium calcinable to chromium oxide, also simultaneously depositing ammonium silicofluoride on said support, drying the resulting mixture, and heating the resulting composite at a temperature in the range 450 to 1400° F. for a period of time in the range 5 minutes to 20 hours to increase the activity of said catalyst, at least part of the chromium in the catalyst thus produced being hexavalent.

8. A process which comprises adding to a supported chromium oxide catalyst ammonium silicofluoride and heating the resulting mixture at a temperature in the range 750 to 1400° F. for a time in the range 5 minutes to 20 hours to increase the activity of said catalyst, the resulting catalyst containing at least part of its chromium in the hexavalent state and said support being a compound selected from the group consisting of silica, alumina, zirconia and thoria.

9. A catalyst preparation process for increasing the activity of said catalyst which comprises admixing, with a silica-alumina support, ammonium silicofluoride and at least one compound selected from the group consisting of chromium oxide and chromium compounds calcinable to chromium oxide, and heating the resulting mixture at a temperature in the range 750 to 1400° F. for a period of time in the range 5 minutes to 20 hours and leaving at least part of the chromium in the hexavalent state.

10. A catalyst preparation process which comprises dry mixing ammonium silicofluoride with a chromium oxide-silica-alumina catalyst, the amount of said silicofluoride added ranging from 0.1 to 8 weight percent, based on total catalyst, and heating the resulting mixture at a temperature in the range 750 to 1400° F. to activate said catalyst and leave at least part of the chromium in the hexavalent state.

11. A process which comprises incorporating with a chromium oxide-silica catalyst ammonium silicofluoride in an amount ranging from 0.1 to 8 weight percent, based on total catalyst, and heating the resulting mixture at a temperature in the range 750 to 1400° F. for a time in the range 5 minutes to 20 hours, the resulting catalyst containing at least part of its chromium in the haxevalent state.

12. A catalyst produced according to claim 6.

13. A process for the preparation of a solid polymer of ethylene which comprises contacting a monomeric mixture containing at least 75 weight percent ethylene, the remaining monomer being selected from the group consisting of propylene, 1-butene, 1-pentene, and 1-octene, at a polymerization temperature ranging from 150–350° F. with a chromium oxide-silica-alumina catalyst, said catalyst having at least part of the chromium in the hexavalent state and having been activated prior to said contacting by heating in the presence of 0.1 to 8 weight percent, based on total catalyst, of ammonium silicofluoride at a temperature ranging from 750–1400° F. for a period of time sufficient to activate said catalyst for said process and leave at least part of the chromium in the hexavalent state, and recovering a resulting solid polymer.

14. A process for the preparation of a solid polymer of ethylene which comprises contacting a monomeric mixture containing at least 75 weight percent ethylene, the remaining monomer being 1-butene, at a polymerization temperature ranging from 150–350° F. with a chromium oxide-silica catalyst, said catalyst having at least part of the chromium in the hexavalent state and having been activated prior to said contacting by heating in the presence of 0.1 to 8 weight percent, based on total catalyst, of ammonium silicofluoride at a temperature ranging from 750–1400° F. for a period of time sufficient to activate said catalyst for said process and leave at least part of the chromium in the hexavalent state, and recovering a resulting solid polymer.

References Cited in the file of this patent

UNITED STATES PATENTS

| 2,825,721 | Hogan et al. | Mar. 4, 1958 |
| 2,912,422 | Fotis | Nov. 10, 1959 |
| 2,982,803 | Folkins et al. | May 2, 1961 |

OTHER REFERENCES

Handbook of Chem. and Phy., Chemical Rubber Pub. Co., 35th Edition, 1953, pages 474–475 pertinent.

Linear and Steroregular Addition Polymers, by Gaylord, Interscience Publishers Inc., New York, 1959, page 265 relied on.